United States Patent [19]

Brelsford et al.

[11] Patent Number: 4,459,079
[45] Date of Patent: Jul. 10, 1984

[54] UNLOADING AUGER CONTROL SYSTEM

[75] Inventors: John E. Brelsford, Terre Hill; Emmett F. Glass, Akron, both of Pa.

[73] Assignee: Sperry Corporation, New Holland, Pa.

[21] Appl. No.: 59,852

[22] Filed: Jul. 23, 1979

[51] Int. Cl.³ .............................................. B60P 1/00
[52] U.S. Cl. .................................... 414/505; 414/523; 251/297
[58] Field of Search ............... 414/505, 504, 526, 523, 414/786; 137/625.69; 251/297; 91/368, 358 A

[56] References Cited

U.S. PATENT DOCUMENTS

| | | | |
|---|---|---|---|
| 2,755,776 | 7/1956 | Morris | 91/358 A |
| 3,186,424 | 6/1965 | Peach | 137/596 |
| 3,213,881 | 10/1965 | Findlay et al. | 137/625.69 |
| 3,638,812 | 2/1972 | Ryczek | 414/523 |
| 3,667,723 | 6/1972 | Schneider | 91/358 A |
| 3,670,913 | 6/1972 | Reaves | 414/523 X |
| 3,721,359 | 3/1973 | Howell et al. | 414/523 X |
| 3,790,129 | 2/1974 | Pauls | 91/358 A X |
| 3,905,500 | 9/1975 | Bourges | 91/358 A X |
| 4,024,974 | 5/1977 | Hodge | 91/358 A X |
| 4,047,542 | 9/1977 | May et al. | 137/596.12 |
| 4,099,449 | 7/1978 | Orimoto et al. | 91/358 A |
| 4,170,308 | 10/1979 | Rogers | 91/358 A X |
| 4,195,551 | 4/1980 | Schmiel | 91/358 A |

Primary Examiner—John J. Love
Assistant Examiner—L. E. Williams
Attorney, Agent, or Firm—Larry W. Miller; Frank A. Seemar; Darrell F. Marquette

[57] ABSTRACT

In a crop harvesting and threshing machine there is provided apparatus that will permit the unloading auger and tube to be automatically moved from at least an inboard first position to an outboard second position by the momentary manual engagement of the control apparatus for substantially less time than that required for the unloading auger and tube to move from the first position to the second position.

14 Claims, 9 Drawing Figures

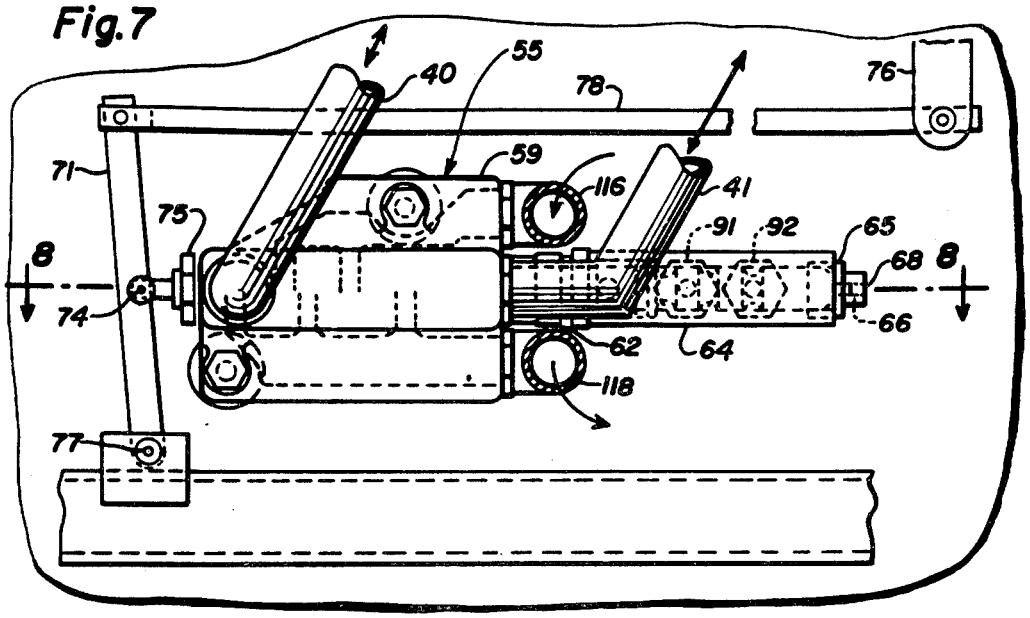
Fig.7
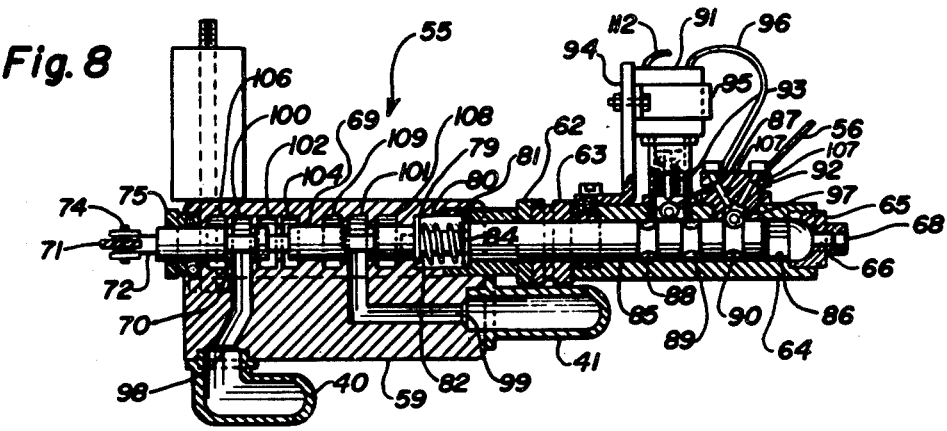
Fig.8
Fig.9

UNLOADING AUGER CONTROL SYSTEM

BACKGROUND OF THE INVENTION

This invention relates generally to crop harvesting and threshing machines, more commonly known as combines, and more particularly, to the apparatus used to control the unloading auger by which cleaned grain is unloaded from the grain tank to a receiving vehicle. Specifically, the invention is directed to a control mechanism which allows the combine operator to activate the unloading auger by momentarily engaging the unloading auger control, permitting the auger to rotate off of the auger switch and then releasing the control, thereby having the unloading auger swing from the fully inboard or storage position to a predetermined outboard position automatically for the unloading of grain. This invention is applicable to all types of combines which utilize some type of grain unloading tube that must move between predetermined positions of non-operation and operation.

Traditionally combines utilize a grain storage system that has the threshed and cleaned grain transported by means of a collection trough and auger to an elevator which carries the cleaned grain upward into a receiving receptacle or grain tank. The grain is continuously fed into the grain tank during the operation of the combine as it harvests and threshes crop material in the field. The continuous field operation of a combine is generally limited by the capacity of the grain tank to store the clean grain. When the grain rank is full, the combine operator must normally cease the harvesting and threshing operation to unload grain from the grain tank to a receiving vehicle. Occasionally, this unloading operation is conducted simultaneously with the continued harvesting and threshing by having a receiving vehicle move alongside the combine as it progresses down the field. The receiving vehicle may either be a wagon towed behind a tractor or a large grain truck. These receiving vehicles haul the unloaded grain to appropriate storage areas generally remote from the field. This procedure is repeated continuously during the harvesting and threshing of the crop material.

Combine operators normally activate the unloading system by engaging a lever or a switch which requires that the operator continue its engagement during the entire time that it takes the unloading tube to swing from its inboard to its outboard position. Should the unloading operation be conducted while the combine continues to harvest and thresh crop material this requires the operator to direct his attention to several functions at one time. The operator must continually monitor the crop material which is being harvested to the front of the combine as it moves across the field, scan the numerous monitors displayed on the combine control panel and observe the movement of the unloading tube from the inboard to the fully outboard position which is utilized for unloading. Since the operator must continue to steer the combine during this time, this means that the operator must remove one of his hands from the steering wheels and simultaneously conduct at least two operations. Obviously this is a difficult and distracting procedure which could inadvertently cause the operator to vary from his desired path across a field. At the least, the continuous engagement of the unloading tube control mechanism is an inconvenience. The foregoing problems are solved in the design of the machine comprising the present invention by permitting the combine operator to engage the unloading tube control momentarily, thereby activating a system which will permit the unloading tube to automatically swing from the full inboard to the fully outbaord position without any further operator involvement.

SUMMARY OF THE INVENTION

It is a principal object of the present invention to provide in a combine an improved control means for the grain tank unloading means which upon manual activation for a period of time substantially less than that required for the unloading means to move from a first position of non-operation to a second position in which unloading is performed, the control means is effective to automatically move the unloading means from the first position to the second position.

It is a further object of the present invention to provide a relatively simple mechanism that will reduce the amount of operator involvement required in the unloading operation of the grain from the grain tank of a combine.

It is a feature of the present invention that the control means includes a hydraulic fluid directional control valve with a multi-grooved spool that is positionally controlled by the combined operation of a solenoid and a plurality of electrical switches as a part of a hydraulic circuit that is self-contained within the combine.

It is another feature of the instant invention that the unloading means comprises an unloading auger within an unloading tube that is pivotally movable or swingable between an inboard storage position and an outboard unloading position by a hydraulic cylinder that is controlled by the flow of hydraulic fluid through the hydraulic fluid directional control valve.

It is another feature of the instant invention that the unloading auger and tube are automatically stopped in their outboard movement by the engagement of a contact plate with an additional switch which is remotely mounted from the hydraulic valve.

It is another feature of the present invention that the control means has an inherent safety that prevents the unloading auger from being inadvertently activated to move from the inboard to the outboard position upon starting of the combine.

It is an advantage of the present invention that the unloading of the grain tank while the combine continues to operate across a field is made easier because of the reduced operator involvement in the operation.

It is another advantage of the present invention that the automatic movement of the unloading auger between the first and second positions is manually overrideable at any point therebetween.

These and other objects and advantages are obtained by providing apparatus in a crop harvesting and threshing machine that will permit the unloading auger and tube to be automatically moved from at least an inboard first position to an outboard second position by the momentary engagement of the control means for substantially less time than that required for the unloading auger and tube to move from the first position to the second.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 7 is an enlarged plan view of the hydraulic fluid directional control valve with the spool extension attached thereto taken along the lines 7—7 of FIG. 1;

FIG. 8 is a side elevational view of the hydraulic valve showing the relationship of the two interconnected spools, the centering spring, the solenoid controlled detent ball and the electrical ball switch taken along the lines 8—8 of FIG. 7; and FIG. 9 is a diagrammatic illustration of the electro-hydraulic circuit utilized in the improved control means for the unloading auger tube of the combine.

DETAILED DESCRIPTION OF THE PREFERRED EMBODIMENT

Figure 1:
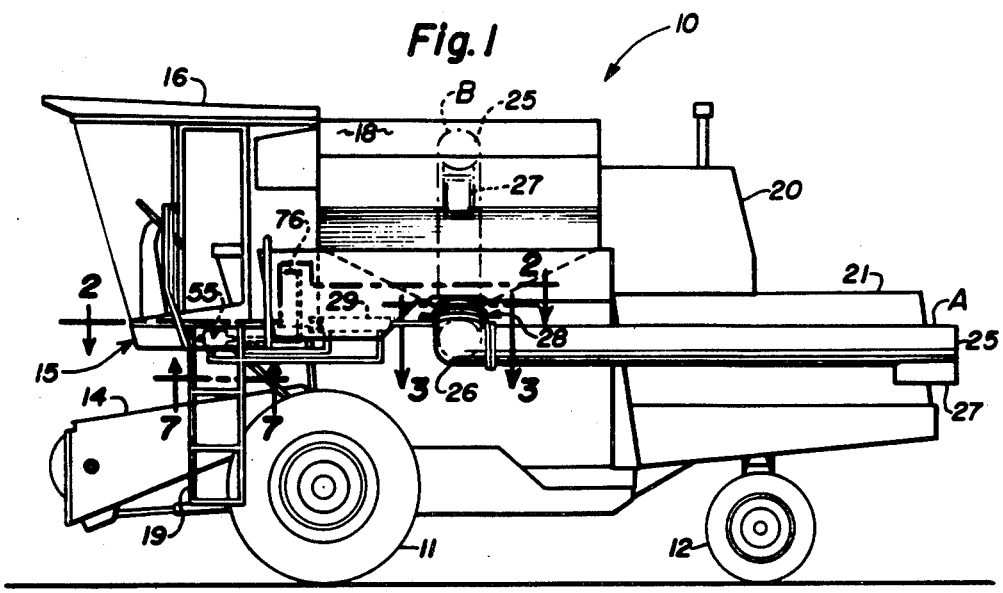
FIG. 1 is a side elevational view of a crop harvesting and threshing machine with the improved control means shown in phantom lines.

Referring to FIG. 1, there is shown a combine indicated generally by the numeral 10 in a side elevational view with the critical portions of the instant invention shown partially in detail in phantom lines and partially in solid lines at reduced scale. As can be seen, the combine 10 has a mobile frame mounted to a pair of primary driving wheels 11 in the front and a pair of smaller steerable wheels 12 in the rear. It is powered by an engine (not shown) which is usually deisel fuel consuming. The engine is mounted to the upper portion of the combine in a suitable fashion and, by means of drive belts or sprocket chains, is drivingly connected to the operational components of the combine.

The combine 10 generally has a header (not shown) and an infeed housing 14 mounted at its front, as seen in FIG. 1. The combine 10 has a main frame or housing indicated generally by the numeral 15, that internally supports a threshing and separating means (not shown), as well as the operator's cab 16 and the grain tank 18. The operator's cab 16 extends forwardly over the front of the main frame 15 and is atop the infeed housing 14. The cab 16 has a ladder 19 which provides access for the operator to the cab and extends outwardly and downwardly therefrom. Housings 20 and 21 enclose the engine and the discharge beater and discharge grate assembly (both of which are not shown), respectively.

The structure thus far has been described generally since it is old and well known in the art. This structure and the interrelationships between the various operating components of the combine are described in greater detail in U.S. Pat. Nos. 3,626,472, issued Dec. 7, 1971; 3,742,686, issued July 3, 1973; and 3,995,645, issued Dec. 7, 1976; all to Rowland-Hill, hereinafter specifically incorporated by reference in their entirety, insofar as they are consistent with the instant disclosure.

Figure 2:
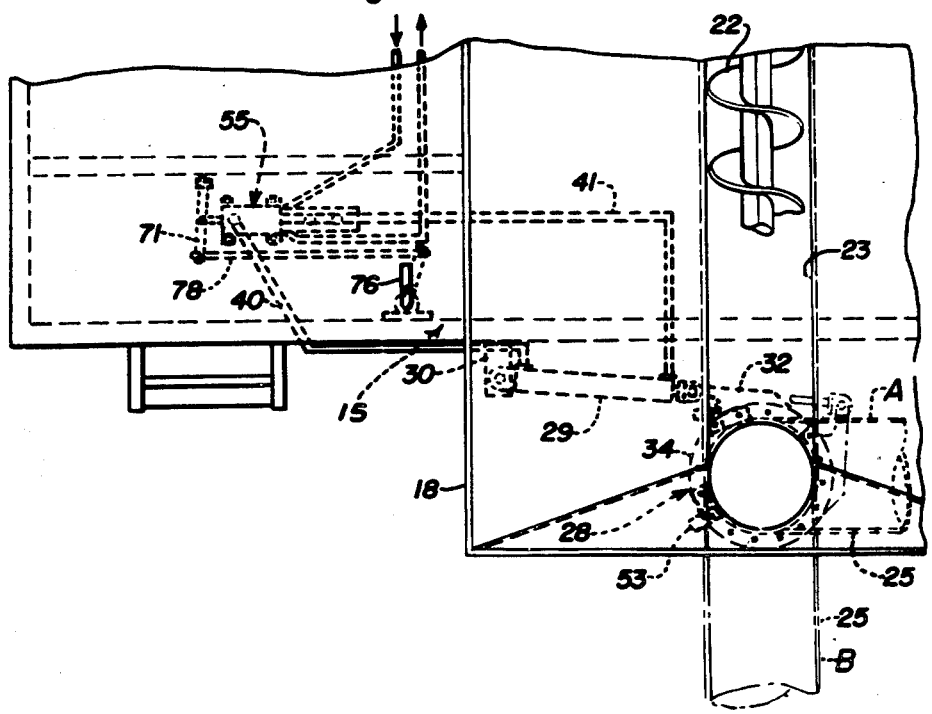
FIG. 2 is an enlarged top plan view taken along the lines 2—2 of FIG. 1 showing the unloading auger tube hydraulic circuit and the fluid control valve controlling the flow of hydraulic fluid to the hydraulic cylinder which moves the unloading auger tube between the inboard and outboard positions.

Best seen in FIG. 2, a grain tank has along its bottom most portion a horizontal grain tank unloading auger 22 contained within an elongate, open-topped trough 23. As seen in FIG. 1, the grain tank 18 has a pivotal unloading auger tube 25 within which is contained a rotatable auger (not shown). Tube 25 is fastened to the grain tank via elbow housing 26, which is in turn appropriately fastened to unloading auger ring 28. A horizontal auger tube extension 24 connects into elbow housing 26 at the outboard end of horizontal grain tank unloading tube 25. Elbow housing 26 is joined to unloading auger tube 25 via elbow housing flange 35 and unloading auger tube flange 36 by a suitable number of nuts and bolts.

Figure 3:
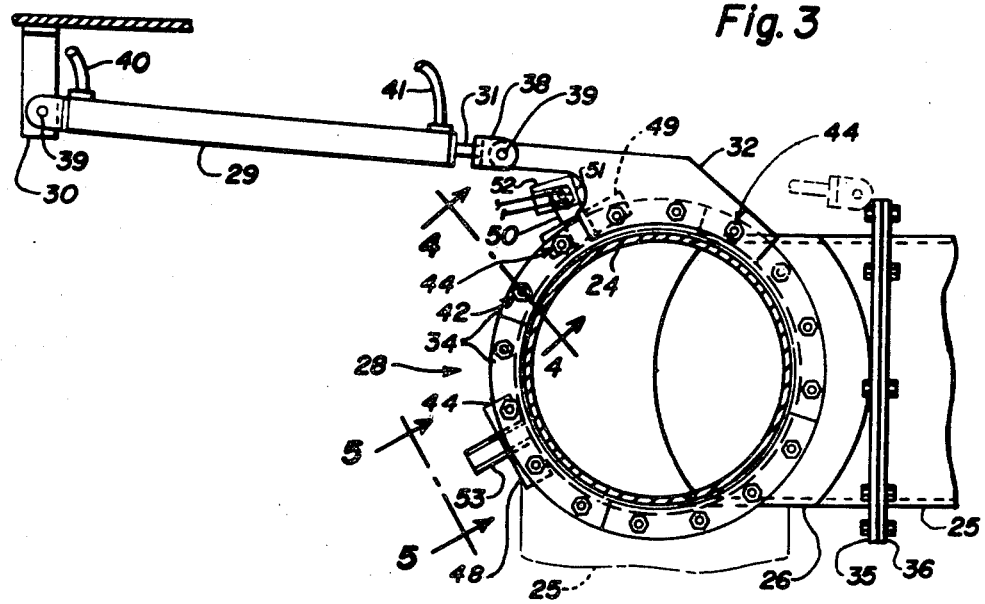
FIG. 3 is an enlarged top plan view taken along the lines 3—3 of FIG. 1 showing the unloading auger tube ring and hydraulic cylinder with the ball switch and contact plates attached thereto.

Double acting hydraulic cylinder 29, seen also in FIGS. 2 and 3, is connected to the unloading auger ring 28 at the rod end 31 of the cylinder 29 via a mounting bracket 32 and double arm bracket 38. On its opposing end hydraulic cylinder 29 is fastened via bracket 30 to the combine frame. Rod-like fasteners 39 fasten the cylinder 29 to bracket 30 and also via double arm bracket 38 to bracket 32, thereby movably connecting the cylinder 29 to the bracket 32. Hydraulic lines 40 and 41 of FIG. 3 lead into opposing ends of the cylinder of hydraulic cylinder 29. Hydraulic cylinder 29, upon activation, pivotally moves the unloading auger tube 25 with its auger from an inboard storage or transport position illustrated as A in FIGS. 1 and 2 to an outboard unloading position illustrated as B. Tube 25 at its outboard end has a discharge opening 27 through which crop material passes into a receiving vehicle when the tube is is in the outboard position and it is desired to unload the grain tank 18.

Figure 4:
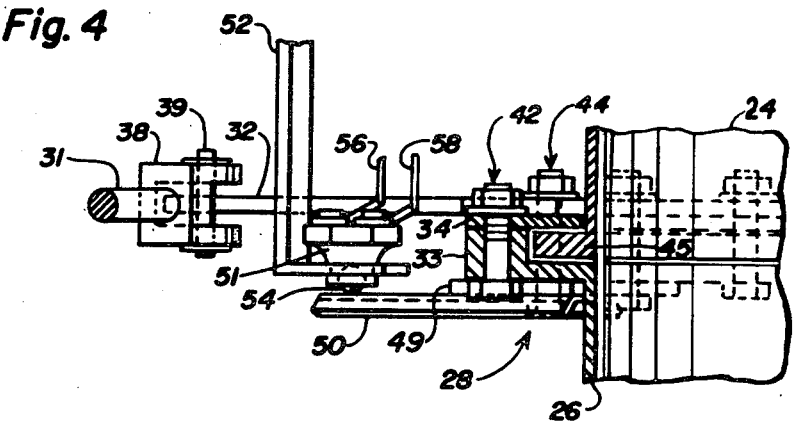
FIG. 4 is an enlarged side elevational view of the ball switch on the unloading auger tube ring taken along the line 4—4 of FIG. 3.

Unloading auger ring 28 is best illustrated in and understood from viewing FIGS. 3 and 4. Bracket 32, which moves in response to the extension of the rod end 31 of hydraulic cylinder 29, is fastened to the ring 28 by a series of bolts and locking nuts and washers which are indicated generally by the numerals 44 in FIG. 4. As seen in FIG. 4, the bolts and locking nuts and washers 42 and 44 extend through suitably sized apertures in the L-shaped portion 33 of ring 28 and its annular covering plate 34. Bolts and locking nuts and washers 42 and 44 help securely fasten the annular covering plate 34 to the L-shaped portion 33 of the ring 28 which extends upwardly and outwardly from elbow housing 26. The lower portion of ring member 28 adjoins elbow housing 26. Rotatably seated within the L-shaped portion 33 of ring member 28 and beneath the annular covering plate 34 is the annular flange extension 45 of horizontal auger tube extension 24 leading from the grain tank. Auger tube extension 46 is functionally connected to horizontal grain tank unloading auger tube 23. None of the bolts and locking nuts and washers 42,44 pass through this annular flange portion 45. Flange portion 45 remains stationary and the L-shaped portion 33 and annular covering plate 34 of unloading auger ring 28, therefore, rotate about flanged portion 45 when the hydraulic cylinder 29 is activated.

Figures 5, 6:
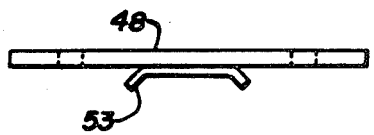
FIG. 5 is an enlarged side elevational view of the contact plate and its mounting bracket which fastens to the unloading tube ring taken along the line 5—5 of FIG. 3.
FIG. 6 is an end elevational view of the contact member and mounting bracket shown in FIG. 5.

Also fastened to the unloading auger ring 28 and the annular covering plate 34 are a pair of mounting plates 48 and 49, best shown in FIGS. 3 and 4. Mounting plate 48 is fastened to the annular covering plate 34 by bolts and locking washers and nuts 44. Welded to the underside of mounting plate 48 is contact plate 53 which is sloped on its sides so as to form opposing ramps. Contact plate 53 is best shown in FIGS. 5 and 6. Mounting plate 49 has a contact plate 50 which is identical in structure and mounting to contact plate 53 and is best shown in FIGS. 3 and 4.

The fluid directional control valve 55 is best shown in isolated detail in FIGS. 7 and 8. Valve 55 is also shown integrated within the entire operating circuit, including the operational apparatus of the unloading auger tube control means, in FIG. 2. Valve 55 in FIG. 7 generally consists of a main valve housing 59 having multiple ports for the ingress and egress of hydraulic fluid. Hydraulic lines 40 and 41 each permit the two way flow of hydraulic fluid into the valve 55 during the operation of the double acting hydraulic cylinder 29. An adaptor 62 fastens appropriately to the end of housing 59 and, with connector 63, serves to join extension housing 64 therewith. On the end of the extension housing 64 distant from the main housing 59 a cap 65 is appropriately fastened. The cap contains a breather vent 66 with a breather screen plug 68 on its extreme end. Alternately, extension housing 64 could equally well be joined to the main valve housing 59 by only the use of adaptor 62 and a set screw in extension housing 64 to hold the extension housing 64 onto the adaptor 60.

As seen in FIG. 8 there is a first spool 69 within valve housing 59 which is movable within the linear central bore 70. On its forward and exteriorly projecting end spool 69 is connected to link 71 via a double arm bracket 72 and a locking pin 74. O-ring housing 75 seals the front portion of bore 70 in housing 59 and has an appropriately sized aperture through which the portion of spool 69 which connects to link 71 projects. Link 71 pivots about link support and pivot point 77 of FIG. 7 in response to the manual activation of the lever 76 within the operator's cab 16, briefly see FIG. 1, to linearly slide the spool 69 within bore 70. Levers 71 and 76 are movably interconnected by connecting link 78.

As shown in FIG. 8, spool 69 on its interior side abuts against a washer 79 which sets against one end of the centering spring cavity 80. A centering spring 81 is mounted about a rod member 82. On the opposing end of the rod from washer 79 is another washer 84 mounted about the rod member 82. Spool 85 abuts against washer 84 and is linearly movable within bore 86. The compression of spring 81 and washer 79 and 84 against the opposing lips in the centering spring cavity limits the linear movement of spools 69 and 85. Rod member 82 is detachably fastened to spool 69 and is preferably an extension of spool 85. Spool 85 has three grooves 88, 89 and 90 which allow spool 85 and spool 69, through rod member 82 and spring 81, to be retained in predetermined positions to selectively permit the flow of hydraulic fluid in either of two working directions through the hydraulic circuit or to permit a non-working flow of fluid to pass through the control valve 55 while the spools are in the center neutral position illustrated in FIG. 8.

Extension housing 64 has removably mounted to the top a solenoid detent mechanism 91 and a ball switch 92. The solenoid detent mechanism 91 is fastened to a bracket 94 by a clamping bracket 95 near the top of the solenoid 91. Bracket 94 is appropriately fastened to the top of the housing 64, such as by welding or a screw. An electrical conducting wire 96 connects solenoid detent mechanism 91 and ball switch 92. The solenoid detent mechanism 91 includes a locking ball 87 and a spring 93 which is compressed when the electrical circuit is closed to permit ball 87 to ride up and out of either groove 88 or 89 in spool 85. Ball switch 92 has a ball 97 movably mounted within its housing so that it seats in groove 90 when the spools 69 and 85 are in the center neutral position, but which rides upwardly into contact with wires 107 when the hydraulic circuit is working by directing hydraulic fluid to hydraulic cylinder 29. Thus the solenoid detent mechanism 91 serves to control the linear movement and positioning of spool 85 and, through the centering spring 81 and rod member 82, the positioning of spool 69. Since the control of the flow of the hydraulic fluid in the hydraulic circuit is accomplished within the main valve housing 59, this arrangement effectively controls the flow of hydraulic fluid through the hydraulic circuit. The structure of the main valve housing 59 and the spool 69 has been described only generally since that structure is old in the art and is commercially available from the Fluid Power Division of Cessna Corporation as Part No. 315352-AAE.

The channeling within that portion of the valve housing assembly 59 where spools 69 and 85 are located will be described briefly. As shown in FIG. 8 hydraulic lines 40 and 41 connect to reversible flow ports 98 and 99, respectively. The reversible flow ports 98 and 99 lead into reversible flow chambers 100 and 10, respectively. When the spool 69 is in the neutral portion, the hydraulic fluid flows from inlet flow port 116, see briefly FIG. 7, to inlet chamber 102 and then directly to return chamber 104 from where the fluid is returned via the outlet flow port 118 of FIG. 7 to the reservoir 105, briefly seen in FIG. 9. Alternate flow or inlet chamber 109 receives the hydraulic flow from the inlet flow port 116 of FIG. 7 when the spool is positioned to move the unloading auger tube 25 to the inboard position. When the tube 25 is being moved from the inboard to the outboard position the spools 69 and 85 are positioned so hydraulic fluid flows from inlet flow port 116 to inlet chamber 102 and reversible flow chamber 100. The return flow of hydraulic fluid enters flow port 99, chamber 101 and chamber 108 and then proceeds via outlet flow port 118 (FIG. 7) to the reservoir 105 when the unloading auger tube 25 is being moved to the outboard position when the tube 25 is moved to the inboard position the fluid return flow enters flow port 98, chamber 100 and chamber 106 and exits via outlet flow port 118 to the reservoir 105.

The electro-hydraulic circuit is diagrammatically illustrated in FIG. 9. Battery 110 is connected to starter switch 111. Starter switch 111 is electrically connected by line 112 to the solenoid detent mechanism 91. Solenoid detent mechanism 91 is connected by wire 96 to normally open ball switch 92, which in turn connects with the normally open ball switch 51 on the auger tube ring 28 via wire 56. Wire 58 runs from the auger tube ring ball switch 51 back to the battery. The starter or ignition switch must be on for the circuit to be operational and for the solenoid detent mechanism 91 and ball switch 92 to control the flow of hydraulic fluid through the fluid directional control valve 55. The hydraulic fluid is pumped from the reservoir 105 through pump 115 about the hydraulic circuit. Pump 115 brings the hydraulic fluid into the fluid control valve 55 via inlet flow port 116, best shown in FIG. 7 and carries it out via outlet flow port 118 generally as described above.

In operation, the operator drives the combine 10 across the field harvesting the crop material. When the grain tank 18 is filled with grain, the operator engages the lever 76 within the operator's cab. Lever 76, through connecting link 78 and link 71, causes the double arm bracket 72 connected to spools 69 and 85 to move rearwardly by pivoting link 71 about link support and pivot point 77. This causes the hydraulic fluid, which has been entering the fluid directional control valve 55 via inlet flow port 116 and the neutral position inlet chamber 102 and exiting via the neutral position return chamber 104, to be redirected from inlet chamber 102 into chamber 100. The hydraulic fluid is then routed out through flow port 98 to hydraulic cylinder 29. The hydraulic fluid is carried from flow port 98 to the base end of hydraulic cylinder 29 via hydraulic line 40. The flow of fluid then forces the rod end 31 of hydraulic cylinder 29 outwardly causing the unloading auger ring 28 to rotate and ball switch 51 to break contact with contact plate 50.

This breaks the electrical circuit causing the solenoid detent mechanism 91 to stop compression of the spring 93 and allows the ball 87 to be forced downwardly as the spring 93 extends to engage the groove 88 of spool 85. Locked in this position the spool 69 permits the flow of hydraulic fluid to pass through directional control valve 55 so as to continue moving the unloading auger tube 25 and the auger contained within from the inboard position to the outboard position without the need for the operator to continue to engage lever 76. Spool 69 also compresses the centering spring 81 within the centering spring cavity.

When the unloading auger tube 25 and the auger contained within have swung to a sufficiently outboard position for the contact plate 53 on the unloading auger ring 28 to engage the normally open ball switch 51 the electrical circuit is then again completed. This causes the flow of current to go from the battery to the solenoid detent mechanism 91 and compress the spring 93. The current then continues through ball switch 92 and completes the circuit back to switch 51. The compression of the spring 93 within solenoid detent mechanism 91 allows the locking ball 87 to disengage from groove 88 to permit the centering spring 81 to return the spools 69 and 85 to the neutral center position shown in FIG. 8. This stops the flow of hydraulic fluid through the cylinder 29 and again directs the fluid from the reservoir 105 through the pump 115 into the directional control valve 55 via inlet flow port 116 and inlet chamber 102. The fluid continues out of the valve 55 through return chamber 104 and outlet flow port 118 back to the reservoir 105. Thus, the electro-hydraulic circuit has positioned the unloading auger in the fully extended or outboard position shown as B in FIGS. 1 and 2.

When the operator desires to return the unloading auger tube 25 and its auger to the inboard position, shown as A in FIGS. 1 and 2, the operator reengages the lever 76 moving the connecting link 78 so that link 71 pivots about link support and pivot point 77 to move the spools 69 and 85 forwardly. This forward movement of the spool 69 allows the hydraulic fluid to flow from the pump 115 into the fluid directional control valve 55 via inlet flow port 116 and inlet chamber 109. Hydraulic fluid then passes through flow chamber 101, flow port 99 and exits the control valve 55 via hydraulic line 41 enroute to the hydraulic cylinder 29. The fluid causes the rod end 31 of cylinder 29 to retract, thereby commencing the pivoting of the unloading auger ring 28 and the unloading auger tube 25 from the outboard position toward the inboard position. As soon as the contact plate 53 has broken contact with the normally open ball switch 51, the electrical circuit is broken. This again causes the pressure within solenoid detent mechanism 91 to stop the compression of spring 93 and permits the locking ball 87 to engage groove 89 of spool 85. This positioning of spool 85 locks spool 69 into position to permit the flow of hydraulic fluid to continue without the need for the operator to continue to engage lever 76 so that the fluid leaves hydraulic cylinder 29 and returns via hydraulic line 40 to flow port 98. The hydraulic fluid then passes through flow chamber 100 and into the return chamber 106 from which it is directed to the hydraulic reservoir 105 via outlet flow port 118 to complete the fluid circuit. When the unloading auger tube 25 has returned sufficiently inboard to permit contact plate 50 to reengage ball switch 51 the electrical circuit is again completed and spring 93 within solenoid detent mechanism 91 is compressed, allowing the locking ball 87 to ride upwardly out of groove 89 in spool 85. The centering spring 81 then again repositions the spools 69 and 85 in the center neutral position, directing the flow of hydraulic fluid through the directional control valve 55 via inlet flow port 116, inlet chamber 102, return chamber 104 and outlet flow port 118. The spools 69 and 85 are retained in their center position by centering spring 81. In the centering position the ball 97 within the normally open switch 92 enters the groove 90 of spool 85 breaking the electrical circuit so there is no flow of current when spools 69 and 85 are in the neutral position.

Should the lever 76 inadvertently be engaged by the operator while the unloading auger tube 25 and its auger are in either the inboard or outboard positions prior to having started the combine, the surge of electricity through the circuit upon starting will always cause the solenoid to compress the solenoid spring 93, thereby permitting the ball 87 to ride upwardly out of either groove 88 or 89 and allowing the centering spring 81 to position the spools 69 and 85 in their neutral center position. Thus, the unloading auger tube 25 and its auger will never be accidentally swung from the outboard to the inboard position or vice versa upon engaging the ignition switch or starter. The latter possibility would be especially dangerous should the combine 10 be stored within a closed building with obstructions in the path of movement of the unloading auger tube 25 that could cause damage to either the combine, the structure or both in the event of such an accidental activation.

Should the operator desire to stop the unloading auger tube 25 at any point intermediately of the first fully inboard position and the second fully outboard position the automatic movement therebetween is manually overrideable by simply engaging the control lever 76 to cause connecting link 78 and link 71 to move in the appropriate direction to cause spools 69 and 85 to return to the center neutral position. As described previously, this cuts off the flow of fluid to the hydraulic cylinder 29 and stops the rotation of the unloading auger tube 25.

Additionally, it should be noted that spool 85 and housing 64 with its solenoid detent mechanism 91 and ball switch 92 could be adapted to control the positioning of other hydraulically controlled components, both on combines and other machinery. For example, with the appropriate electro-hydraulic circuits such apparatus could be used to raise and lower combine headers between predetermined positions or to control the positioning of buckets or scoops on earth working machinery between a fully extended dump position and a second scooping position. Also on earth working machine during a leveling operation it is difficult for an operator to physically see when his bucket is level. With an arrangement similar to that utilized on the instant invention, the bucket would automatically be level each time it is positioned in the scooping position, thereby relieving the operator of this normally manually controlled and imprecise operation.

While the preferred structure in which the principles of the present invention have been incorporated is shown and described above, it is to be understood that the invention is not to be limited to the particular details thus presented, but in fact, widely different means may be employed in the practice of the broader aspects of this invention. The scope of the appended claims is intended to encompass all obvious changes in the details, materials and arrangements of parts which will occur to one of ordinary skill in the art upon a reading of this disclosure.

Having thus described the invention, what is claimed is:

1. In a harvesting and threshing machine operable to move across a field for harvesting the grain bearing portions of crop material thereon, comprising
    (a) a mobile frame;
    (b) infeed means mounted to the frame;
    (c) threshing and separating means mounted to the frame adjacent the infeed means to thresh the crop material and separate the grain bearing portions therefrom;
    (d) grain cleaning means mounted to the frame and cooperative with the threshing and separating means;
    (e) grain storage means mounted to the frame to receive and store the cleaned grain;
    (f) unloading means operably mounted to the frame to selectively unload the cleaned grain from the storage means, the unloading means being movable between at least a first position of non-operation and a second position in which unloading is performed;
    (g) power means mounted to the frame and connected to the unloading means for selectively moving the unloading means between the first position and the second position, said power means including a hydraulic circuit having a hydraulic cylinder, a hydraulic fluid reservoir, a fluid directional control valve and circulating means to force the hydraulic fluid about the hydraulic circuit; and
    (h) control means operatively connected to the power means and the unloading means to effect, upon manual activation for substantially less time than that required for the unloading means to move from the first position to the second position, a movement of the unloading means from the first position to the second position for unloading when the unloading means is in the first position and to effect movement of the unloading means from the second position to the first position when the unloading means is in the second position, said fluid directional control valve including a first housing with a first spool means linearly movably mounted therein, a second housing fastened to said first housing with a second spool means linearly movably mounted therein, said first and second spool means being in coordinated movably responsive relationship with a centering spring, said second spool means including first and second spaced apart grooves formed therein, said control means including a first switch and a solenoid detent control mechanism mounted to said second housing, said solenoid detent control mechanism being engageable with said first and second grooves to correspond to the flow of fluid through said hydraulic circuit along first and second working paths of travel, respectively, fluid moving along said first working path of travel effecting movement of said unloading means from said first position to said second position, fluid moving along said second working path of travel effecting movement of said unloading means from said second position to said first position, said solenoid detent control mechanism being operable when engaged with one of said grooves to maintain said second spool means in a fixed position against the force exerted by said centering spring until said unloading means has moved from one of said positions to the other said position.

2. The harvesting and threshing machine according to claim 1 wherein the control means further comprises sensing means to cause the power means automatically to stop operation when the unloading means reaches the second position.

3. The harvesting and threshing machine according to claim 1 wherein the sensing means further comprises a second electrical switch included within said electrical circuit and cooperable with a first contact member and a second contact member mounted to the unloading means such that when the unloading means is in the first position the second switch engages the first contact member and in the second position the second switch engages the second contact member to close said electrical circuit to energize said solenoid and automatically stop the flow of fluid through the control valve to the hydraulic cylinder and when said unloading means is between the first and second positions the electrical circuit is open, keeping said solenoid in a non-energized state to retain said first movable ball engaged with said second spool means and permitting the flow of fluid from the fluid control valve to the hydraulic cylinder.

4. The harvesting and threshing machine according to claim 3 wherein the unloading means further comprises a selectively actuatable auger rotatably mounted within a generally elongate cylindrical tube pivotally movable between the first and second positions.

5. In a harvesting and threshing machine having infeed means to deliver crop material from a field to threshing and separating means rotatably mounted to the mobile frame, grain cleaning means, grain storage means, grain transport means to collect and transport the grain from the cleaning means to the storage means, and a grain unloading system having an unloading tube movable between at least a first position and a second position to convey the grain out of the storage means, the improvement comprising:
    manually activatable control means for the unloading system to selectively effect the movement of the unloading tube from the first position to the second position upon manual activation for substantially less time than that required for the unloading tube to move from the first position to the second position, said control means including a solenoid connected to a source of electrical power by an electrical circuit and operable to effect the movement of said unloading means after said manual activation, said electrical circuit including first and second switches, said first switch being operatively connected to said unloading means to sense the position of said unloading means, said second switch being operatively connected to said control means to sense the activation of said control means, said first and second switches controlling the operation of said solenoid such that said unloading means moves from said first position to said second position after said manual activation with said unloading means being stopped at said second position, said control means further including a fluid directional control valve having a housing with a spool means linearly movably mounted therein to control the direction of fluid flow therethrough, said spool means having first and second spaced apart grooves formed therein, said housing having said second switch and a detent mechanism controlled by said solenoid mounted thereon, said detent mechanism being engageable with said first and second grooves to releasably retain the position of said spool means until said unloading means moves to the desired position.

6. The harvesting and threshing machine according to claim 5 wherein said housing includes a first housing member and a second housing member fastened to said first housing member, said spool means including first and second spools linearly movably mounted in said first and second housing members, respectively, and being in coordinated movably responsive relationship with a centering spring, the second housing having mounted thereto said second switch and said detent mechanism both said second switch and said detent mechanism being cooperative with the second spool to control the coordinated linear displacement of the first and second spools, said second spool having said first and second grooves formed therein, said second switch being a ball switch.

7. The harvesting and threshing machine according to claim 6 wherein the first switch includes a first contact member and a second contact member mounted to the unloading means such that when the unloading means is in the first position the first switch engages the first contact member and in the second position the first switch engages the second contact member to automatically stop the flow of fluid through the control valve to the hydraulic cylinder, when said unloading means is between the first and second positions the flow of fluid is permitted from the fluid control valve to the hydraulic cylinder.

8. The harvesting and threshing machine according to claim 2 wherein said second spool means is movable in a neutral position wherein the flow of fluid moves along a non-working path of travel, said solenoid detent control means including a first movable ball engageable with said first and second grooves to releasably retain the selected position of said second spool means until the unloading means has moved into the desired position, said first movable ball being engageable with said second spool means intermediate said first and second grooves when said second spool means is in said neutral position.

9. The harvesting and threshing machine according to claim 8 wherein said solenoid detent control means includes a solenoid engageable with said first movable ball to urge said first movable ball into engagement with said second spool means when said solenoid is in a non-energized state, when said solenoid is energized, said first movable ball is permitted to move away from said second spool means allowing said centering spring to return said second spool means to said neutral position, said solenoid being connected to a source of electrical power by an electrical circuit.

10. The harvesting and threshing machine according to claim 9 wherein said second spool means includes a third spaced apart groove formed therein, said first switch being a ball switch included in said electrical circuit having a second movable ball engageable with said third groove when said second spool means is in said neutral position, the movement of said second spool means from said neutral position effecting a disengagement of said second movable ball from said third groove to close said first switch.

11. The harvesting and threshing machine according to claim 7 wherein said second spool is operable to effect movement of said unloading means both from said first position to said second position and from said second position to said first position when manually activated for substantially less time than that required for said unloading means to move between said first and second positions.

12. The harvesting and threshing machine according to claim 11 wherein said second spool is biased toward a neutral position by said centering spring, said detent mechanism being engageable with said second spool intermediate said first and second grooves when said second spool is in said neutral position, the engagement of said first switch with one of said contact members effecting a disengagement of said detent mechanism from said second spool to permit said centering spring to return said second spool to said neutral position wherein the flow of fluid to the hydraulic cylinder is stopped.

13. The harvesting and threshing machine according to claim 12 wherein said ball switch includes a movable ball engageable with a third groove formed in said second spool when said second spool is in said neutral position, manual activation of said second spool to engage said detent mechanism with one of said first and second grooves causing a disengagement of said movable ball from said third groove to close said ball switch.

14. The harvesting and threshing machine according to claim 13 wherein said solenoid urges said detent mechanism into engagement with said second spool when in a non-energized state, the closing of said first switch by engagement thereof with one of said contact members and the closing of said second switch by the disengagement of said movable ball from said third groove effecting an energizing of said solenoid to permit said detent mechanism to release said second spool so that said centering spring can return said second spool to said neutral position.

* * * * *